W. B. CLEVELAND.
METHOD OF ELECTRIC WELDING.
APPLICATION FILED JUNE 11, 1915.
1,264,611.
Patented Apr. 30, 1918.
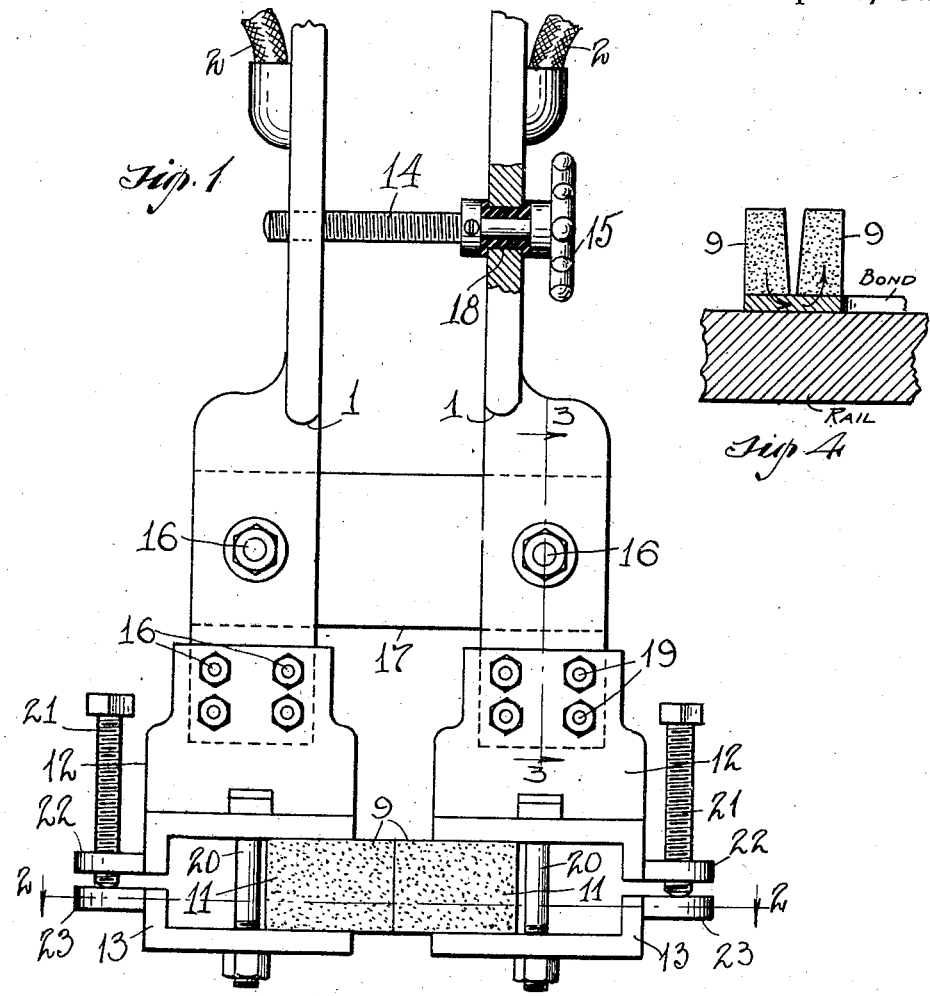
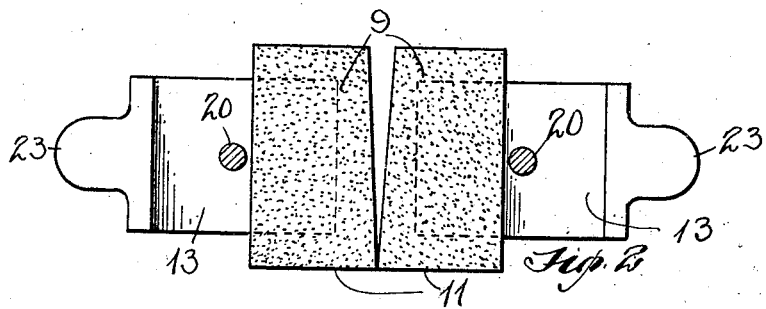
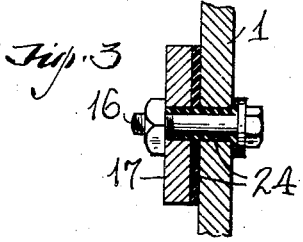
WITNESSES
O. M. Kappler.
Thos. H. Fay
INVENTOR
William B. Cleveland
By Fay, Oberlin & Fay
ATTORNEYS

UNITED STATES PATENT OFFICE.

WILLIAM B. CLEVELAND, OF CLEVELAND, OHIO, ASSIGNOR TO THE ELECTRIC RAILWAY IMPROVEMENT COMPANY, OF CLEVELAND, OHIO, A CORPORATION OF OHIO.

METHOD OF ELECTRIC WELDING.

1,264,611. Specification of Letters Patent. Patented Apr. 30, 1918.

Application filed June 11, 1915. Serial No. 33,504.

*To all whom it may concern:*

Be it known that I, WILLIAM B. CLEVELAND, a citizen of the United States, and a resident of Cleveland, county of Cuyahoga, and State of Ohio, have invented a new and useful Improvement in Methods of Electric Welding, of which the following is a specification, the principle of the invention being herein explained and the best mode in which I have contemplated applying that principle, so as to distinguish it from other inventions.

The present improved method of electric welding may be regarded in a sense as an improvement on the so-called "Herrick" process of making a homogeneous mechanical juncture, said process being described in United States Letters Patent No. 1,012,077 to Albert B. Herrick, dated December 19, 1911. The present improvements, as in the case of such Herrick process, while not in any sense limited to any particular field of use, are more especially designed for welding or brazing bonds onto rails with the aid of the electric current in the production of the necessary welding or brazing temperature.

The characteristic feature of the apparatus utilized in carrying out my present improved method or process, is hence the welding electrode, the latter forming the subject matter of a separate application filed October 16, 1909, Serial No. 522,921 now issued into United States Patent No. 1,147,209, dated July 20, 1915, out of which the present case has been divided.

In carrying out such "Herrick" process, it has been usual heretofore to employ in greater or less degree, the rail being bonded as a part of the return circuit for the electric current employed in the operation. It is not always convenient or possible, especially in construction work, to utilize the above preferred arrangement, and in such case it may become desirable to avoid use of the rails altogether, even to a limited extent, as a part of the return circuit. By the use of the present method, then, it is designed to produce electrically an intense source of heat for use in carrying on the "Herrick" process, or other analogous heating process, while confining the path of the current almost entirely to such electrode.

To the accomplishment of this and related ends, said invention consists of the steps hereinafter fully described and particularly pointed out in the claims.

The annexed drawing and the following description set forth in detail certain steps and mechanism embodying the invention, such disclosed means constituting, however, but one of the various mechanical forms adapted for the carrying out of my improved process, and so are to be regarded as merely illustrative of the way in which the principle of the invention may be used. For example the apparatus described and claimed in my co-pending application filed September 5, 1913, Serial No. 788,315 now issued into United States Patent No. 1,160,261, dated November 16, 1915, which has been required to be divided out of the parent case, previously referred to, shown and describes a form of apparatus adapted to carry on a modified form of the present process.

In said annexed drawing:—

Figure 1 is a front elevational view of an apparatus, specifically one form of electrode, embodying my present improvements and adapted to be used in my improved method or process; Fig. 2 is a transverse sectional view of such electrode taken on the line 2—2, Fig. 1; Fig. 3 is a sectional detail taken on the line 3—3, Fig. 1; and Fig. 4 is a diagrammatic representation of the method or process involved in using such electrode in welding a bond to a rail.

Referring to the foregoing figures of the drawing, it will be seen that the electrode proper is supported by two depending arms 1, the upper ends of which are suitably secured to a movable support (not shown), such as that afforded by a truck or the like, as will be readily understood upon reference to the above mentioned Patent, No. 1,012,077. Said supporting arms, however, are insulated from each other and provided with independent electrical connections 2, whereby they may be included in series in an electric circuit. Said supporting arms, moreover, are relatively movable, being preferably pivotally attached at points intermediate between their ends, as by bolts 16, to the respective ends of a short bar 17, which is either constructed of insulating material or else is suitably insulated from said arms by other means, such as layers of interposed insulation 24, as illustrated in Fig. 3. For effecting movement of the arms relatively to each other, a screw 14 is then provided, connecting the upper ends of the arms by being rotatably mounted in one such arm so as to be held against longitudinal movement, and having threaded engagement with the other, an insulated bushing 18, or equivalent means, being provided in order to maintain the arms electrically separate. Said screw is desirably provided with a hand wheel 15 for convenience in operation.

By reason of the foregoing construction, it will be obvious that upon drawing the upper ends of the two arms 1 toward each other by rotating said hand wheel and screw in the proper direction, the lower ends of said arms will be moved away from each other, in the plane of the drawing in Fig. 1; while by rotating such screw so as to force such upper ends of the arms apart, the lower ends thereof will conversely be moved toward each other.

Suitably attached to each of said arms 1, as by bolts 19, is a clamp member 12, to which in turn is attached, as by means of a bolt 20, a complementary clamp member 13, thus providing a separate set of such clamp members 12, 13 on each arm. The latter are adapted to receive corresponding electrode sections 9, consisting of two entirely separate pieces of carbon or other suitable high resistance material. To assist the bolts 20 in operating the respective sets of clamp members to secure such electrode sections in place, two set-bolts 21 are provided, the same being threaded in ears 22 projecting laterally from the respective clamp members 12 and adapted to press with their ends against alined ears 23, respectively, laterally projecting from the electrode members 13.

By reason of the construction of the clamp members, as just described, not only are the electrode sections 9 detachably secured therebetween so as to be interchangeable and thus permit a fresh electrode to be substituted for one that has become worn out or deteriorated, but such sections or individual blocks 9, may also be independently moved in a direction transverse of their forward faces 11 or at right angles to the plane of the drawing in Fig. 1, in order to permit the forward adjustment of said blocks as the latter wear away, and thus insure that said blocks will respectively contact with the desired degree of pressure against the body being operated upon, as will be presently described. In order to loosen the electrode sections so as to permit the same to be either removed or adjusted, as above described, it will ordinarily be sufficient to turn said screws 21 so as to relieve the clamping pressure of the lower clamp members 13; but if this is not sufficient, the nuts of the bolts 20 may also be loosened, without it, however, being necessary to detach said clamping members 13.

The electrode sections or blocks 9 are so disposed between the respective sets of clamp members 12, 13 or else are so shaped as to bring the forward edges of said blocks closer to each other than the rear edges thereof and thus cause such forward edges to contact as illustrated in Fig. 2, when the lower ends of the arms 1 are forced together by operation of the screw 14, while leaving an air space between the remainder of their juxtaposed faces, which serves to electrically separate the two blocks save at such forward edges. By operating the screw 14 in the reverse direction so as to move the lower edges of the arms 1 apart, the blocks may be entirely separated. The forward faces of said blocks, whether the latter are thus brought into partial contact or entirely separated, lie in substantial alinement as shown in Figs. 1 and 2, and are contiguously disposed, being so formed as to fit the bond terminal, or other body upon which it is desired to operate.

In utilizing the foregoing apparatus, the electrode sections or blocks 9 are preliminarily brought together in the manner previously described, thus closing the electric circuit through the conductors 2 and the arms 1, said blocks being retained in such contact for a sufficient length of time to bring them to a relatively high temperature before their contact faces are approached to the bond terminal, or other article to be welded. This preliminary heating effect will of course be most pronounced in the portions of the electrodes nearest the contacting edges thereof, that is in the portions bounded by the contiguous contact faces of the blocks. Upon now pressing such contact faces of the electrode sections against the bond or other body to be heated, even if the edges of such sections be left in contact, by far the larger volume of current will bridge its way across from the one section to the other through the bond, this being the path of least resistance. The faces of the blocks are thus brought to and retained at the desired high temperature and at the same time the heating effect of the current in passing through the adjacent portion of the bond or other body, owing to the element of resistance which the latter provides, will assist in bringing such body to the desired temperature for welding or brazing. Where such body is a bond, and the result to be accomplished is the welding or brazing of the latter to a rail, the heat generated in the electrode sections and in the bond passes by conduction to the contacting face of the rail or other second body, and the latter brought to the proper temperature for the desired operation, practically simultaneously with the first body.

By means of the foregoing construction of electrode I provide electrically a source of heat that may be handled much as a torch or blow pipe in the manner in which it may be brought up to the body to be operated upon. It will be understood that were an integral block of carbon simply interposed in the circuit, it would be difficult to raise the exterior surface thereof, designed for contact with the bond, to the necessary temperature. By using, however, two separate carbons and bridging the current from one to the other in the manner described, the contiguously disposed contact faces of both are readily maintained in desired incandescent state.

Other modes of applying the principle of my invention may be employed instead of the one explained, change being made as regards the process herein disclosed, provided the step or steps stated by any one of the following claims of the equivalent of such stated step or steps be employed.

I therefore particularly point out and distinctly claim as my invention:—

1. The method of homogeneously uniting two metal bodies, which consists in holding such bodies in contact at the desired point of union, preliminarily heating two electrodes of high resistance by passing a heating electric current through the same while out of contact with said bodies, then pressing contiguously disposed faces of such electrodes against one of said bodies and passing such heating electric current through such electrodes and body until a high temperature is produced, whereby such body and the contacting face of the second body are brought to a welding temperature practically simultaneously, substantially as described.

2. The method of homogeneously uniting two metal bodies, which consists in holding such bodies in contact at the desired point of union, preliminarily heating two electrodes of high resistance by bringing the same into contact and passing a heating electric current therethrough, then separating such electrodes and pressing contiguously disposed faces thereof against one of said bodies, and passing such heating electric current through such electrodes and body until a high temperature is produced, whereby such body and the contacting face of the second body are brought to a heating temperature practically simultaneously, practically as described.

Signed by me this 7th day of June, 1915.
WILLIAM B. CLEVELAND.
Attested by—
 Wm. E. Huber,
 A. E. Gilbert.